June 17, 1958 — T. D. GALLOWAY — 2,839,390
CYCLIC PROCESS OF EXTRACTING LEAD AND ZINC METALS
Filed July 23, 1954
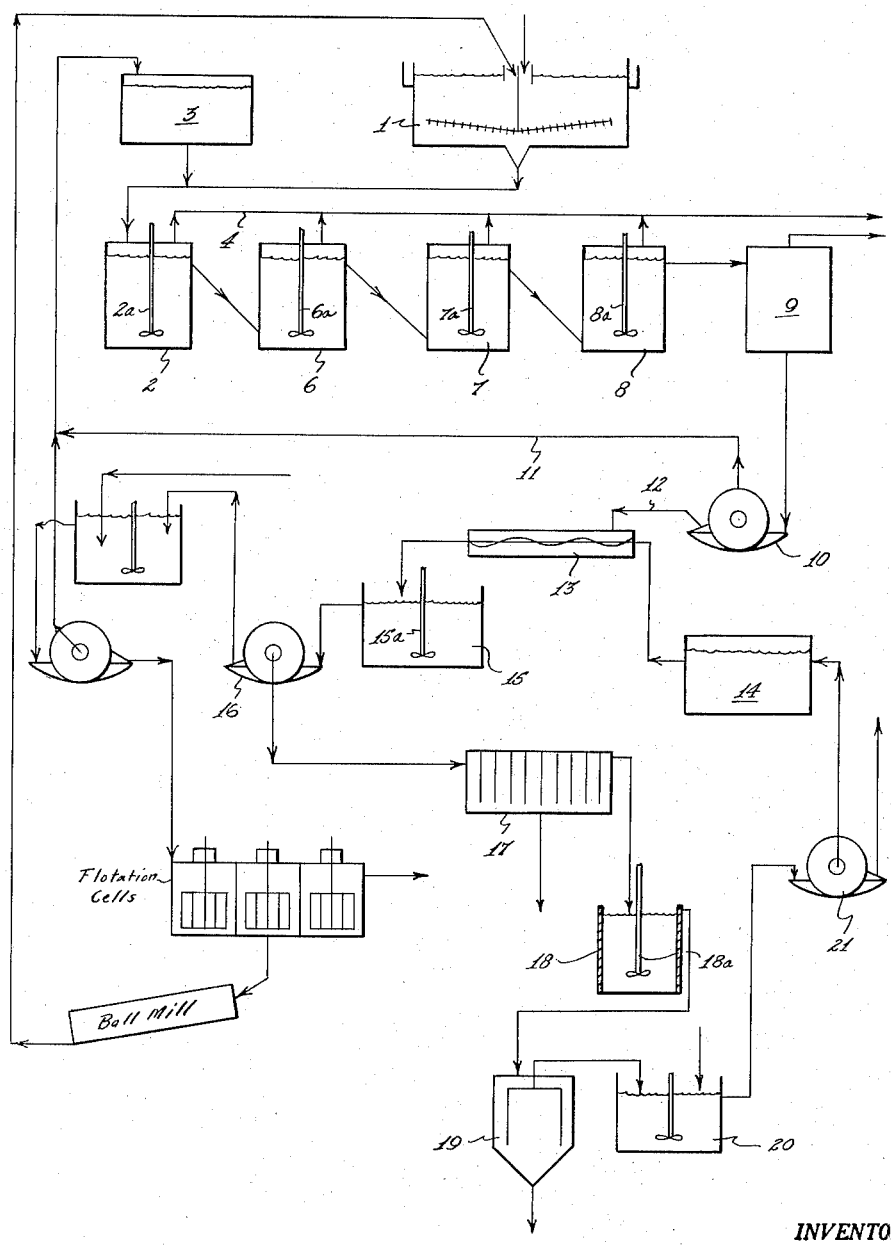
INVENTOR.
Torrence D. Galloway
BY
Greek Wells
Atty.

United States Patent Office 2,839,390
Patented June 17, 1958

2,839,390

CYCLIC PROCESS OF EXTRACTING LEAD AND ZINC METALS

Torrence D. Galloway, Metaline Falls, Wash.

Application July 23, 1954, Serial No. 445,212

6 Claims. (Cl. 75—120)

My invention relates to a cyclic process of extracting metals such as lead and zinc from their ores. In general the lead and zinc ores, namely, galena and sphalerite occur together with varying amounts of gold, silver, copper, antimony, arsenic, iron, manganese, cadmium, calcium, barium, cobalt, magnesium, bismuth, vanadium, tungsten, and molybdenum. The oxide ores of lead and zinc such as cerussite, anglesite, calamine, and smithsonite may also be found with these other minerals as impurities. It is the principal purpose of this invention to provide a wet process which will enable the operator to produce lead and zinc as metals from concentrates of ores obtained by flotation without the necessity of selective flotation; the metal is obtained from the wet process without being processed by the smelter. The only furnaces needed are in the refining operation which follows refinery practice.

I have found that by the proper use of oxalic acid, the lead and zinc sulfides of galena and sphalerite may be altered and thereafter the product freed of excess hydrogen sulfide that results from alteration. The resulting product is then filtered to remove excess oxalic acid for reuse and the filter cake repulped with a solution of calcium acetate. The resulting product is a calcium oxalate precipitate with lead and zinc acetates in solution. The calcium oxalate can be treated with sulfuric acid to recover the oxalic acid for reuse. Lead metal is next obtained direct from the acetate solution by treating the solution with zinc metal in the form of zinc crust, scrap powder, or other form. This operation precipitates the lead as an impure lead sponge from which a pure lead may be made by the usual refinery practice. The zinc acetate solution remaining can then be boiled to remove the iron as an insoluble basic ferric acetate.

After filtration to remove the iron, the remaining zinc acetate solution can be treated with milk of lime (calcium hydroxide). This precipitates the zinc as zinc hydroxide and leaves calcium acetate for reuse in converting more of the lead and zinc oxalates to the acetates as described previously. The zinc hydroxide can be refined in the refinery to produce the metal.

When the ores are of the cerussite, anglesite, calamine and smithsonite forms they may be initially treated with a strong solution of caustic soda to convert the lead and zinc into soluble compounds. This solution can then be treated with hydrogen sulfide (the gaseous by-product from the oxalic process) to precipitate the lead and zinc as sulfides. These sulfides can then be passed through the steps of treatment previously outlined for galena and sphalerite for recovery of the lead and the zinc.

The foregoing brief outline of the process will be more fully developed hereinafter by a specific description of the detailed example in connection with the accompanying drawing wherein a flow sheet of the operation is shown. Before undertaking the detailed description of example, however, some of the practical and commercial factors relating to this process should be explained.

At present the mill operator who is endeavoring to recover lead and zinc from the ores is confronted with the problem of separating the lead and zinc fractions of the ores into two products in order to obtain advantageous consideration from the smelter that refines his product. Generally, the present method employed is selective flotation, repeated cleaning and use of expensive reagents with careful control. With the present method, the flotation of the ore need not effect any separation of the lead and zinc so that the operator obtains a bulk concentrate. This permits him to increase his capacity in the flotation section of his mill without installing additional equipment. The careful controls and the expensive reagents necessary to obtain selective flotation of the zinc and the lead are avoided. It is a known fact that soluble lead salts will activate sphalerite. The use of lead acetate and its recovery in the process, circumvents the present general use of copper sulfate. The lead acetate is obtained from this process through treatment of galena without excess sphalerite.

A particular economic factor that is of importance is the fact that my process enables the operator to obtain metal at the mill. At present the mine operator must send his concentrates to the smelter in order to obtain the metal. With the present process there is not a large consumption of power or fuel such as is necessary in connection with the roasting furances. The cost of the process is basically in the oxalic acid, calcium acetate, sulfuric acid and lime. The oxalic acid and calcium acetate which are most expensive are recycled according to the process so that only the mechanical losses that occur will have to be replaced. Sulfuric acid and lime are actually used up and will have to be replaced. High temperatures are avoided in all phases up to the refining operation. The oxalic acid and the acetate solutions do not present any serious corrosion or filtering problem to make the cost of the containers and piping a serious one. The hydrogen sulfide, which is generated as the oxalic acid attacks the sulfides of the ores, does present a corrosion problem but that is a problem that is already present in other operations and can be allayed.

The oxalic acid, as used in my process, is a white crystalline solid, usually the dihydrate $H_2C_2O_4 \cdot 2H_2O$. It is soluble in water to form a strong acid. Oxalic acid readily attacks FeS but is without effect on $FeS_2$ (pyrite).

The oxalic acid reacts with the sulfides of lead and zinc to produce lead oxalate and zinc oxalate and hydrogen sulfide. Oxalic acid will also convert the iron or iron oxides in the concentrates to the insoluble ferrous oxalate. So long as the hydrogen sulfide is present the oxalate will remain in the ferrous state. When the excess oxalic acid solution is removed, and a calcium acetate solution is added to the zinc and lead oxalates, the zinc, lead and iron oxalates are converted into soluble acetates. The solution can be freed of iron by heating to form insoluble basic ferric acetate which is removed by filtering the solution while hot. The acetic acid is recovered from the ferric acetate by distillation with sulfuric acid. The calcium oxalate which results from the mixing of the calcium acetate with the lead, zinc and iron oxalates is recovered as a precipitate by filtration and can then be reacted with sulfuric acid to convert it to insoluble calcium sulfate and oxalic acid. In practice it is necessary to use an excess of sulfuric acid to prevent the reaction from reversing. The concentration of sulfuric acid used is not critical but a 12% solution is satisfactory.

Referring now to the flow sheet, a specific example of the operation of my process will be given. A quantity of ore containing galena and sphalerite is first concentrated by bulk flotation to assay about 20% lead and 40% zinc. I have found that if the concentrates are ground finer, the reaction with oxalic acid is speeded up. Dependence of speed is relative to the fineness of the original grind to free a floatable product. Eventually these concentrates are thickened in the thickener 1 of the flow sheet and then pumped into the first autoclave 2 where they are heated to 130 degrees C. and held at approximately 30 lbs. per square inch pressure to prevent boiling. The autoclave 2 is equipped with a pressure sealed agitator 2a to aid in heat distribution and to prevent heat concentration in the solids that tend to settle to the bottom. Simultaneously with the introduction of the concentration into the autoclave 2 oxalic acid is pumped from a storage tank 3 into the autoclave 2, the oxalic acid being in a water solution of about 20% to 50%. Hydrogen sulfide is released as a gas and is piped off through the pipe 4 to a recovery unit (not shown). The material from the autoclave 2 is transferred to succeeding autoclaves 6, 7 and 8, each of which has a corresponding agitator 6a, 7a and 8a, and each of which has an outlet to the pipe 4 for carrying away the hydrogen sulfide. Oxalic acid is supplied to autoclaves 6, 7 and 8 to maintain a predetermined concentration of acid.

The several autoclaves and the auxiliary piping 4 used for conveying the gas are constructed of a suitable stainless steel to resist the corrosive action of the hydrogen sulfide. The four autoclaves are all heated to the same temperature, 130 degrees C. It requires about four hours for the material to flow through the several autoclaves. By testing the material flowing from the last autoclave, it was found that the oxalic acid had converted about 90% of the lead to lead oxalate and about 70% of the zinc oxalate. From the autoclave 8 the material is passed to a tank 9 where it is subjected to reduced pressure to boil off the excess hydrogen sulfide and to reduce the temperature to about 60 degrees to 80 degrees C. The material is then dewatered at a filter 10 to remove any excess oxalic acid for reuse, the oxalic acid being taken off through the conduit 11. The solids comprising lead and zinc oxalates and any unconverted sulfides remaining are passed through a conduit 12 to a repulper 13 where a solution of calcium acetate in water from the storage tank 14 is mixed with them. The proportion of calcium acetate to solids used is about one to one by weight. The resulting pulp product is heated and agitated in an open tank 15 for about ½ hour, the agitator 15a being used to keep the product in motion to effect dissolution. The product resulting from reaction of the calcium acetate with the oxalates in the solution is then passed through a filter 16 to separate the precipitated calcium oxalate and any unconverted sulfides that were carried over from the lead and zinc acetates. The filter cake, containing the calcium oxalate and the unconverted sulfides, after treatment with sulfuric acid to recover the oxalic acid is diluted and passed through flotation cells to recover the unconverted sulfides for re-treatment in the grinding section and eventual conversion to soluble acetates. From the filter 16 the lead and zinc acetate solution is taken to a lead precipitating vat 17 where metallic zinc is added to precipitate the lead as a metal sponge, the remaining solution containing the zinc being led into a heated vessel 18 having an agitator 18a. The heating in the vessel 18 results in precipitating any iron therein as basic ferric acetate and it is removed in a Nichols filter 19, leaving the zinc acetate in solution. The zinc acetate solution flows from the filter 19 into a vessel 20 where it is mixed with enough milk of lime to precipitate out the zinc as the hydroxide. The zinc hydroxide precipitate is removed at a filter 21, leaving the calcium acetate to be returned to the storage tank 14.

The zinc hydroxide is sent to the refinery for conversion to metal, zinc oxide or zinc carbonate as desired. Part of the metal recovered from the zinc hydroxide is used in the lead precipitation step. One ton of zinc will precipitate about 3.2 tons of lead from the lead and zinc acetate solution that is fed into the vat 17.

My process can be extended to oxidized ores of zinc and lead such as cerussite, anglesite, smithsonite, and calamine. In order to carry out the recovery of the metals from these ores they must be treated with a strong solution of caustic soda, NaOH. The reaction of the caustic soda with these oxidized ores is as follows:

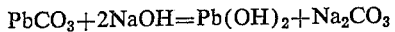

$$PbCO_3 + 2NaOH = Pb(OH)_2 + Na_2CO_3$$

The amount of the caustic soda used in this initial step varies according to the amount of lead and zinc present, about 5 to 10 times by weight of the lead and zinc in the ore.

By using the hydrogen sulfide that is recovered from the autoclaves, the lead hydroxide is precipitated as lead sulfide according to the following reaction:

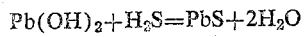

$$Pb(OH)_2 + H_2S = PbS + 2H_2O$$

The lead and zinc sulfides precipitated out are then treated in accordance with the principal process hereinbefore described with oxalic acid. No grinding of the precipitate is necessary. If the oxidized ores also contain some lead and zinc sulfides, these sulfides, which are not attacked by the caustic soda, may be floated by the usual flotation process using lead acetate as an activator and collected as a bulk concentrate which can be ground and treated by the main process in the same manner as the galena and sphalerite ores.

*Examples*

A slurry, consisting by weight of one part of galena—sphalerite concentrates assaying 22.9% lead and 43.4% zinc ground to −325 mesh to nine parts of water—oxalic acid solution made up of two parts water to one part oxalic acid by weight was held in the autoclave at 120 degrees C. for 5 hours, at a pressure of about 30 lbs. per square inch, the hydrogen sulfide being drawn off as it evolved. The effluent from the autoclave was filtered and the filter cake then was repulped in a saturated solution of calcium acetate in water, using three parts by weight of calcium acetate for each part of original concentrate, and agitated and then filtered. The lead and zinc were then recovered from the filtrate by first precipitating the lead by adding one pound of zinc metal to the filtrate for each three pounds of lead shown by the assay to be present in the concentrate used. The lead precipitated was 70.2% of that shown by the assay to be present in the concentrate. The remaining solution was then treated with calcium hydroxide to precipitate the zinc as zinc hydroxide. The amount of zinc as metal in the precipitate was found to be 93.8% of the zinc shown by the assay to be present in the concentrate used.

Another test run using a larger quantity of concentrates ground to −325 mesh was treated in the same manner as described in the example just given. The concentrates assayed 19.5% lead and 42.5% zinc. In this run a water-oxalic acid solution of equal parts water and oxalic acid by weight was used and 4 parts solution to one part of concentrates by weight was used. The mixture was held at 130 degrees C. in the autoclave for four hours. The lead and zinc were recovered in the same manner as in the first example, except that only two parts by weight of calcium acetate was used for each part of original concentrate. In this example the lead recovery was 90.9% of the lead shown by the assay to be present in the concentrate. The zinc recovery was 70.4% of the zinc shown by the assay to be present in the concentrate.

In order to recycle the oxalic acid that is recovered at the filter 10 an evaporator (not shown) may be employed in the fluid return from the filter 10 to concentrate the oxalic acid which is diluted by the moisture in the concentrates and by washing at the filter 10. The oxalic acid recovered from the calcium oxalate precipitate at the filter 16 is separated from the sulfuric acid and brought to the proper concentration for reuse by conventional practices.

It is believed that the nature and advantages of my invention will be understood, by those skilled in the art of metal recovery, from the foregoing description.

Having thus described my invention, I claim:

1. A cyclic process of extracting lead and zinc metals from lead sulfides and zinc sulfides such as galena and sphalerite which comprises the steps of first reacting the lead and zinc sulfides with a 20% to 50% solution of oxalic acid in water at a temperature of about 130 degrees C and a pressure of about 30 lbs. per square inch thereby converting the lead and zinc sulfides to lead and zinc oxalates, drawing off evolved hydrogen sulfide, then releasing the pressure and removing additional hydrogen sulfide evolved, thereafter filtering the resulting product and reacting the filter cake with a saturated solution of calcium acetate in water, thereby converting lead oxalates and zinc oxalates present to water soluble lead acetate and zinc acetate, filtering the product again, then adding metallic zinc to the solution obtained by filtering thereby precipitating lead as metal, removing the solution remaining from the precipitated lead and thereafter precipitating the zinc from said last named solution by adding calcium hydroxide to the solution.

2. A process of extracting lead and zinc from the oxidized ores cerussite, anglesite, smithsonite and calamine which comprises first reacting the ores with a strong solution of caustic soda to produce lead hydroxide and zinc hydroxide in the solution, then precipitating lead and zinc from the solution as lead sulfide and zinc sulfide by treating the solution with hydrogen sulfide, thereafter reacting the lead and zinc sulfides with a 20% to 50% solution of oxalic acid in water at a temperature of about 130 degrees C. and a pressure of about 30 lbs. per square inch thereby converting the lead and zinc sulfides to lead and zinc oxalates, drawing off evolved hydrogen sulfide, then releasing the pressure and removing additional hydrogen sulfide evolved, thereafter filtering the resulting product and reacting the filter cake with a saturated solution of calcium acetate in water, thereby converting lead oxalates and zinc oxalates present to water soluble lead acetate and zinc acetate, filtering the product again, then adding metallic zinc to the solution obtained by filtering thereby precipitating lead as metal, removing the solution remaining from the precipitated lead and thereafter precipitating the zinc from said last named solution by adding calcium hydroxide to the solution.

3. In a process of extracting metal from lead sulfide and zinc sulfide, the steps of first reacting the sulfides with a water solution of oxalic acid thereby converting the lead and zinc sulfides to lead oxalate and zinc oxalate and evolving hydrogen sulfide, drawing off the hydrogen sulfide, filtering the remaining product and then mixing the filter cake with calcium acetate in water, thereby forming water soluble lead acetate and zinc acetate and water insoluble calcium oxalate, then filtering the product to recover a lead acetate and zinc acetate solution.

4. In a process of extracting metal from lead sulfide and zinc sulfide, the steps of first reacting the sulfides with a water solution of oxalic acid thereby converting the lead and zinc sulfides to lead oxalate and zinc oxalate and evolving hydrogen sulfide, drawing off the hydrogen sulfide, filtering the remaining product and then mixing the filter cake with calcium acetate in water, thereby forming water soluble lead acetate and zinc acetate and water insoluble calcium oxalate, then filtering the product to recover a lead acetate and zinc acetate solution, and reacting the precipitate with an excess of sulfuric acid to form oxalic acid for reuse and an insoluble calcium sulfate.

5. In a process of extracting metal from lead sulfide and zinc sulfide, the steps of first reacting the sulfides with a water solution of oxalic acid at a temperature of about 130 degrees C. and under sufficient pressure to prevent boiling, thereby converting the lead and zinc sulfides to lead oxalate and zinc oxalate and evolving hydrogen sulfide, drawing off the hydrogen sulfide, filtering the remaining product and then mixing the filter cake with calcium acetate in water, thereby forming water soluble lead acetate and zinc acetate and water insoluble calcium oxalate, then filtering the product to recover a lead acetate and zinc acetate solution.

6. In a process of extracting metal from lead sulfide and zinc sulfide, the steps of first reacting the sulfides with a water solution of oxalic acid thereby converting the lead and zinc sulfides to lead oxalate and zinc oxalate and evolving hydrogen sulfide, drawing off the hydrogen sulfide, filtering the remaining product and then mixing the filter cake with calcium acetate in water, thereby forming water soluble lead acetate and zinc acetate and water insoluble calcium oxalate, then filtering the product to recover a lead acetate and zinc acetate solution, and thereafter precipitating lead from the solution by adding metallic zinc to it.

References Cited in the file of this patent

UNITED STATES PATENTS

| | | |
|---|---|---|
| 305,524 | Mathieu | Sept. 23, 1884 |
| 509,058 | Weller et al. | Nov. 21, 1893 |
| 2,021,896 | Platten | Nov. 26, 1935 |
| 2,187,750 | Marvin | Jan. 23, 1940 |
| 2,655,472 | Hilliard et al. | Oct. 13, 1953 |

FOREIGN PATENTS

| | | |
|---|---|---|
| 841,388 | France | Jan. 21, 1938 |